(12) United States Patent
Wang

(10) Patent No.: US 9,481,159 B2
(45) Date of Patent: Nov. 1, 2016

(54) METHOD AND DEVICE FOR PASTING OPTICAL PROTECTION FILM ON FLAT SCREEN

(71) Applicant: SHANGHAI BOXIUTE INDUSTRIAL CO., LTD., Shanghai (CN)

(72) Inventor: Xuhui Wang, Shanghai (CN)

(73) Assignee: SHANGHAI BOXIUTE INDUSTRIAL CO., LTD., Shanghai (CN)

( * ) Notice: Subject to any disclaimer, the term of this patent is extended or adjusted under 35 U.S.C. 154(b) by 227 days.

(21) Appl. No.: 14/367,896

(22) PCT Filed: Apr. 26, 2013

(86) PCT No.: PCT/CN2013/074761
§ 371 (c)(1),
(2) Date: Jun. 21, 2014

(87) PCT Pub. No.: WO2013/159732
PCT Pub. Date: Oct. 31, 2013

(65) Prior Publication Data
US 2015/0000831 A1  Jan. 1, 2015

(30) Foreign Application Priority Data
Apr. 28, 2012  (CN) .......................... 2012 1 0129617

(51) Int. Cl.
| B32B 38/00 | (2006.01) |
| B29C 63/00 | (2006.01) |
| B32B 38/18 | (2006.01) |
| B29C 63/02 | (2006.01) |
| B29L 31/34 | (2006.01) |

(52) U.S. Cl.
CPC ........... *B32B 38/18* (2013.01); *B29C 63/0004* (2013.01); *B29C 63/02* (2013.01); *B29L 2031/3437* (2013.01); *B29L 2031/3475* (2013.01)

(58) Field of Classification Search
CPC ....... B32B 38/00; B32B 38/10; B32B 38/18; B29C 63/00; B29C 63/0004; B29C 63/02
See application file for complete search history.

(56) References Cited

U.S. PATENT DOCUMENTS

| 8,567,596 B1* | 10/2013 | Mason, Jr. ........... C11D 17/049 156/230 |
| 2004/0248627 A1* | 12/2004 | Kuo .................... H04M 1/0202 455/575.1 |

FOREIGN PATENT DOCUMENTS

CN            201042860 Y  *  4/2008

OTHER PUBLICATIONS

Ruibin, Wei. "Protection film adhering device." Apr. 2, 2008. Chinese Patent Office.*

*Primary Examiner* — Michael N Orlando
*Assistant Examiner* — Matthew Hoover

(57) ABSTRACT

A device for pasting an optical protection film on a flat screen includes: a holder, a roller holder and a peeling stick, wherein a gate-shaped slot, a rear locating slot and rear locating columns are provided on a rear side of the holder; a device locating chamber, a sliding track, a front locating slot and locating columns are provided on a front side of the holder; wherein the roller holder includes: a roller shell and a roller, wherein the peeling stick is provided inside the front locating slot or the rear locating slot, the roller holder is provided on the sliding track on the front side of the holder for moving. According to the present invention, locating is accurate, pasting costs less time and less effort, and pasting quality is ensured.

1 Claim, 7 Drawing Sheets

METHOD AND DEVICE FOR PASTING OPTICAL PROTECTION FILM ON FLAT SCREEN

CROSS REFERENCE OF RELATED APPLICATION

This is a U.S. National Stage under 35 U.S.C 371 of the International Application PCT/CN2013/074761, filed Apr. 26, 2013, which claims priority under 35 U.S.C. 119(a-d) to CN 201210129617.4, filed Apr. 28, 2012.

BACKGROUND OF THE PRESENT INVENTION

1. Field of Invention

The present invention relates to a pasting technique field of optical protection film, and more particularly to a method and a device for pasting an optical protection film on a flat screen.

2. Description of Related Arts

The conventional optical protection film pasted on the flat screen comprises three basic layers: a protective layer, a product layer and a release layer. During pasting, the flat screen is cleaned at first; and the protection film is tailored according to the shape of the flat screen; then the release layer of the protective film is peeled off and the product layer is aligned with the flat screen for pasting. After pasting, the protective layer is peeled off for finishing pasting. During pasting, locating is difficult, and bubbles as well as dusts are likely to exist between the product layer and the flat screen. Therefore, a lot of time and efforts are cost for pasting, and it is difficult to ensure pasting quality.

SUMMARY OF THE PRESENT INVENTION

According to disadvantages of conventional technologies, an object of the present invention is to provide a method and a device for pasting an optical protection film on a flat screen, wherein the method is simple and convenient; according to the device, locating is accurate, pasting costs less time and less effort, and pasting quality is ensured.

Accordingly, in order to accomplish the above objects, the present invention provides a method for pasting optical protection film on a flat screen, comprising steps of:

a) tailoring a protection film, wherein the step a) particularly comprises steps of:

utilizing the protection film comprising a protective layer, a product layer and a release layer; tailoring the protection film according to a shape and a size of the flat screen together with a locating area, and drilling locating holes on the locating area, cutting an intersection line of an edge of the flat screen and the locating area on the protection film by half-cut, wherein the intersection line separates the release layer from the product layer and keeps the productive layer as a whole; wherein a length of the locating area is 10~50 mm;

b) sticking a peeling stick, wherein the step b) particularly comprises steps of:

sticking a peeling stick on a position which is 0.5~0.8 mm away from the intersection line after tailoring the protection film, wherein the position is on a surface of the release layer within a flat screen area, wherein a length of the peeling stick is 6~10 mm longer than a width of the flat screen; and c) pasting the protection film, wherein the step c) particularly comprises steps of:

locating the protection film facing downwards where the peeling stick is stuck by the locating holes, then putting a device with the flat screen to paste the protection film under the flat screen area of the protection film, pushing the peeling stick by a roller in such a manner that the peeling stick gradually peels off the release layer of the protection film from the product layer, pressing the product layer of the protection film towards the flat screen by the roller for pasting until the product layer of the protection film is fully pasted on the flat screen.

The present invention also provides a device for providing the above method, comprising:

a holder, wherein a longitudinal through-slot is provided in a front side of the holder, two locating columns are provided at an end of the through-slot, a device locating chamber which has a same shape as the device is provided at a side of the two locating columns, a locating slot is provided on an end of the device chamber, two sliding tracks are provided in parallel along top surfaces of two sides of the device locating chamber and vertical to the locating slot; a gate-shaped slot is provided on a rear side of the holder, two rear locating columns are provided corresponding to positions of the locating columns on the front side, a rear locating slot is provided on a side of the rear locating columns, a plurality of locating blocks are provided around the gate-shaped slot; a through-hole is drilled from the front side to the rear side;

a roller holder comprising a roller shell and a roller, wherein a roller bearing seat is provided inside the roller shell, a locking slot and a sliding rail is provided on a roller shell wall, the roller is provided inside the roller bearing seat; and a peeling stick, wherein the peeling stick is a stick unit;

wherein the peeling stick is provided inside the front locating slot or the rear locating slot, the roller holder is provided on the sliding track on the front side of the holder;

wherein an arc pushing arm is provided at an end of the sliding rail on the roller shell wall, and a cross-section of the peeling stick is in a shape of semicircular rectangular.

According to the present invention, locating is accurate, pasting is convenient and costs less time and less effort, and pasting quality is ensured.

These and other objectives, features, and advantages of the present invention will become apparent from the following detailed description, the accompanying drawings, and the appended claims.

Figure 1:
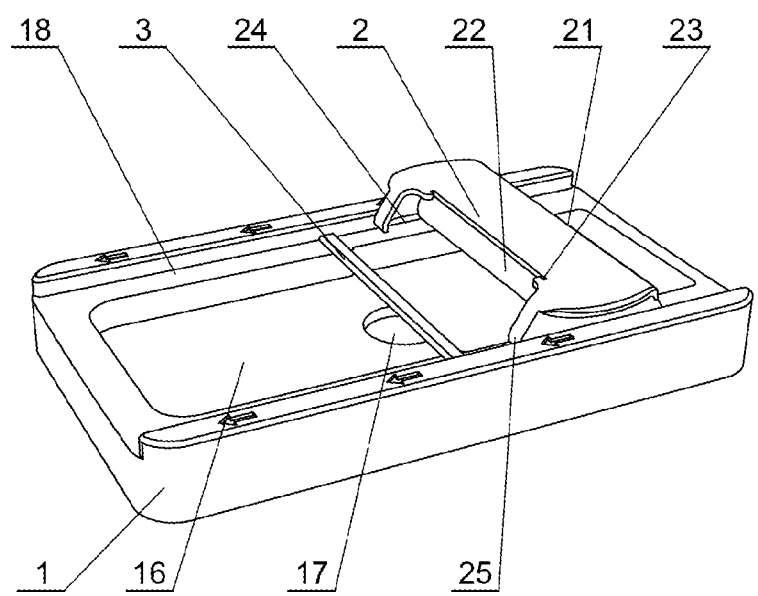
FIG. 1 is a perspective view of a device according to a preferred embodiment of the present invention.

DETAILED DESCRIPTION OF THE
PREFERRED EMBODIMENT

Referring to FIGS. 1 to 5 of the drawings, a device according to the present invention is illustrated, comprising:

a holder 1, wherein a longitudinal through-slot is provided in a front side of the holder, two locating columns 14 are provided at an end of the through-slot, a device locating chamber 16 which has a same shape as the device is provided at a side of the two locating columns 14, a locating slot 15 is provided on an end of the device chamber 16, two sliding tracks are provided in parallel along top surfaces of two sides of the device locating chamber 16 and vertical to the locating slot 15; a gate-shaped slot 11 is provided on a rear side of the holder 1, two rear locating columns 12 are provided corresponding to positions of the locating columns 14 on the front side, a rear locating slot 13 is provided on a side of the rear locating columns 12, a plurality of locating blocks 19 are provided around the gate-shaped slot 11; a through-hole 17 is drilled from the front side to the rear side;

a roller holder 2 comprising a roller shell 21 and a roller 22, wherein a roller bearing seat 23 is provided inside the roller shell 21, a locking slot 26 and a sliding rail 24 is provided on a roller shell wall , the roller 22 is provided inside the roller bearing seat 23; and a peeling stick 3, wherein the peeling stick 3 is a stick unit;

wherein the peeling stick 3 is provided inside locating slot 15 on the front side or the rear locating slot 13, the roller holder 2 is provided on the sliding track 18 on the front side of the holder 1;

wherein an arc pushing arm 25 is provided at an end of the sliding rail 24 on the roller shell wall, and a cross-section of the peeling stick 3 is in a shape of semicircular rectangular.

Figure 2:
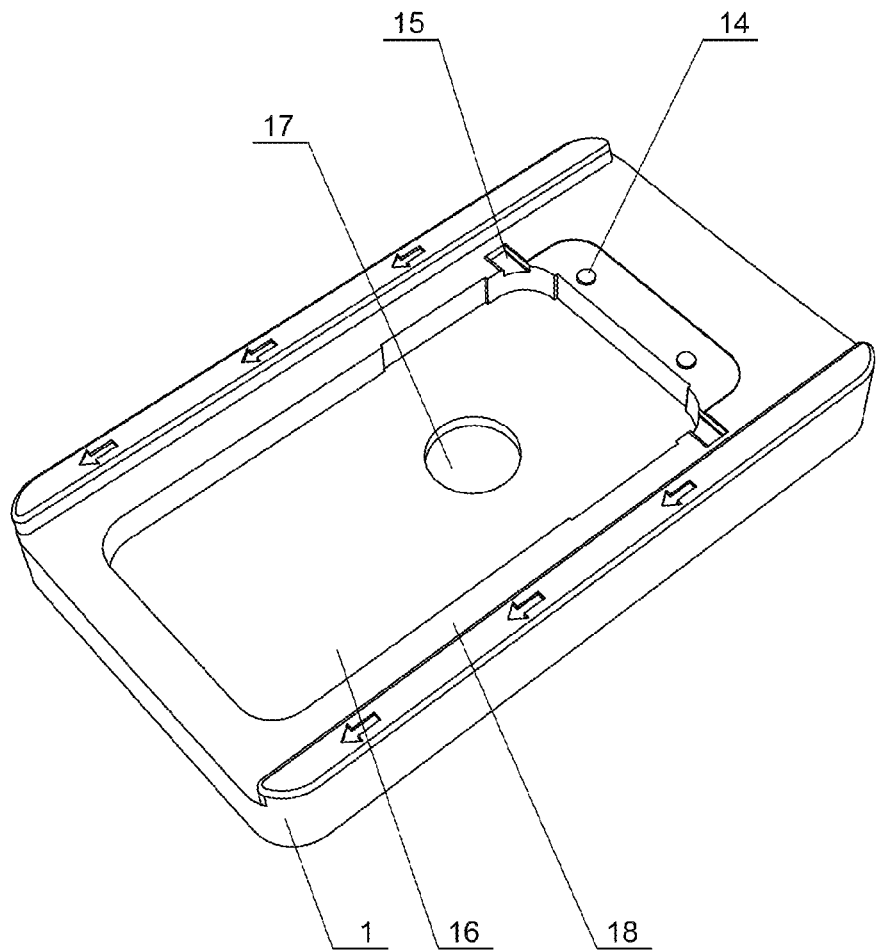
FIG. 2 is a perspective view of a front side of a holder according to the preferred embodiment of the present invention.
Figure 3:
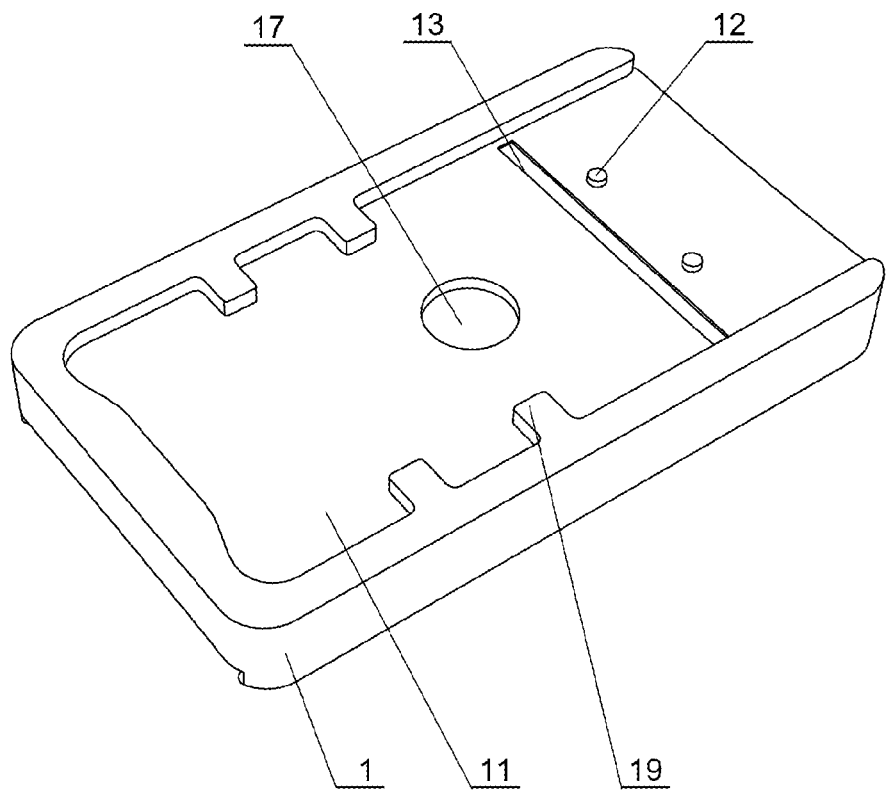
FIG. 3 is a perspective view of a rear side of the holder according to the preferred embodiment of the present invention.
Figure 4:
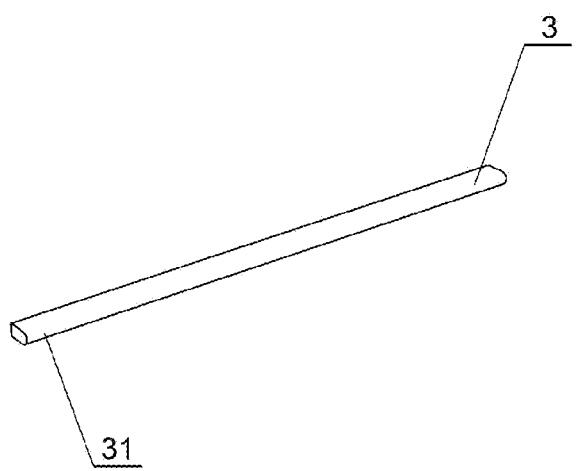
FIG. 4 is a perspective view of a peeling stick according to the preferred embodiment of the present invention.
Figure 5:
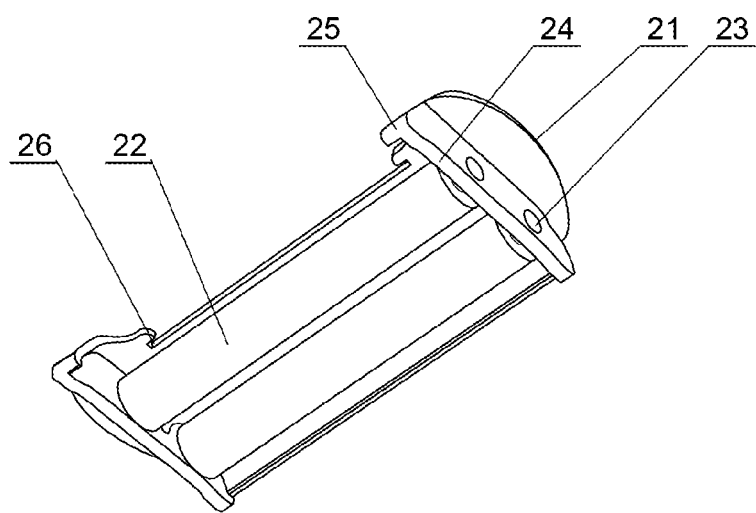
FIG. 5 is a perspective view of a roller holder according to the preferred embodiment of the present invention.
Figure 6:
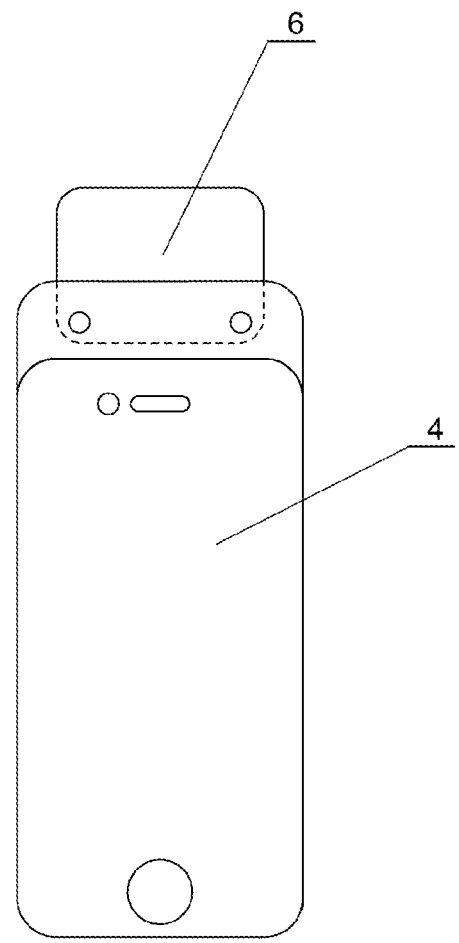
FIG. 6 is a sketch view of application of a protection film according to the preferred embodiment of the present invention.
Figure 7:
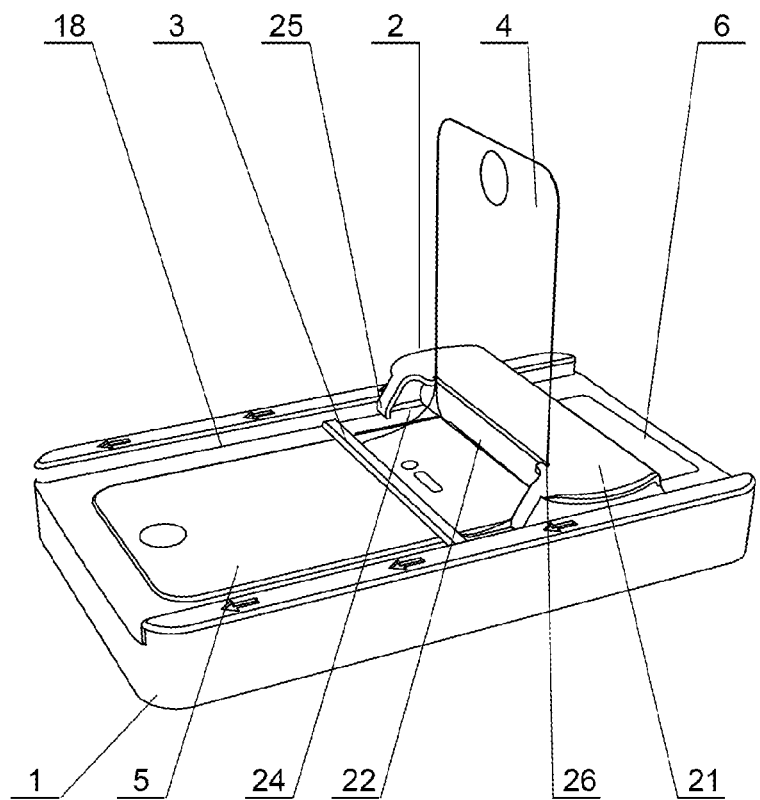
FIG. 7 is a sketch view of the device according to the preferred embodiment of the present invention.

A method according to the present invention comprises steps of:

a) tailoring a protection film, wherein the step a) particularly comprises steps of:

referring to FIG. 6, utilizing the protection film 4 comprising a protective layer, a product layer and a release layer; tailoring the protection film 4 according to a shape of a flat screen 5 and maintaining a locating area at an end thereof, and drilling locating holes on the locating area, cutting an intersection line of an edge of the flat screen 5 and the locating area, wherein the intersection line is cut by half-cut, that is to say, the release layer is separated from the product layer and the productive layer is kept as a whole; wherein a length of the locating area is 40 mm;

b) sticking a peeling stick, wherein the step b) particularly comprises steps of:

referring to FIGS. 3, 4 and 6, applying adhesive on a side flat surface of an arc surface 31 of the peeling stick 3, putting the peeling stick 3 in a rear locating slot 13 in a state that the side flat surface with the adhesive faces upwards and the arc surface 31 faces rear locating columns 12 of the holder 1; putting the protection film 4 in a gate-shaped slot 11, in such a manner that a release layer thereof faces the holder 1 and locating holes on the protection film 4 are casted on the rear locating columns 12, pressing the protection film 4 by fingers, in such a manner that the surface of the peeling stick 3 where the adhesive is applied on is pasted on the release layer of the protection film 4;

c) preparing for pasting, wherein the step c) particularly comprises steps of:

referring to FIGS. 2, 4 and 6, taking out the protection film 4 where the peeling stick is stuck from the gate-shaped slot 11 of the holder 1, putting the protection film 4 in a device locating chamber 16 in a state that the peeling stick 3 faces a front side of the holder 1, in such a manner that the peeling stick is in the locating slot 15 on the front side, casting the locating holes of the protection film 4 on the locating columns 14 on the front side; pasting a peeling sheet 6 between the protection film 4 and the holder 1 at a locating area end, in such a manner that the protective layer of the protection film 4 is pasted on the holder 1 by the peeling sheet 6; raising the protection film at another end thereof from the locating chamber 16, putting the flat screen 5 to paste the protection film on in the device locating chamber 16 on the front side of the holder 1 with a pasting surface of the flat screen 5 facing upwards, putting the protection film 4 down in such a manner that the protection film 4 is above the flat screen 5;

d) pasting the protection film, wherein the step d) particularly comprises steps of:

referring to FIGS. 5 to 7, putting a roller holder 2 above the locating columns on the front side of the holder 1, in such a manner that a sliding rail 24 contacts with a sliding track 18, pushing the roller holder 2 along the sliding track 18, wherein at this time, an arc pushing arm 25 on an end of the sliding rail 24 contacts with the arc surface 31 of the peeling stick 3 and forces the peeling stick 3 to rotate; because the peeling stick 3 is stuck on the release layer of the protection film 4, the release layer of the protection film 4 will be peeled off from the product layer at the intersection line if the peeling stick 3 rotates; then erecting the whole protection film 4 and putting two sides thereof in a locking slot 26 in a roller shell 21, keeping pushing the roller holder 2 along the sliding track 18, in such a manner that the peeling stick 3 peels off the release layer from the product layer under a thrust of the roller holder 2, wherein a roller 22 of the roller holder 2 presses the product layer of the protection film 4 until the roller holder 2 slides out along the sliding track 18 of the holder 1 for gradually pasting the product layer on the flat screen 5; at this time, the product layer of the protection layer 4 is completely pasted on the flat screen 5, and the release layer is taken away by the peeling stick 3; and e) cleaning up, wherein the step e) particularly comprises steps of:

raising the peeling sheet 6 for separating the peeling sheet 6 from the holder 1, holding the peeling sheet 6 tightly for gradually peeling off the protective layer of the production layer 4 from the product layer, wherein at this time, the product layer of the production film 4 has been accurately pasted on the flat screen 5; pushing with a finger in a through-hole 17 between the gate-shaped slot 11 and the device locating chamber 16 for pushing the flat screen where the product has been pasted out from the device locating chamber 16 on the front side of the holder 1 and finishing pasting the protecting film 4; cleaning debris on the holder 1, and preparing for another pasting.

According to the present invention, bubbles as well as dusts are not likely to exist between the product layer and the flat screen 5. The pasting costs less time and less effort while pasting quality is ensured.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for pasting optical protection film on a flat screen, comprising steps of:

tailoring a protection film, wherein the step a) particularly comprises steps of: utilizing the protection film comprising a protective layer, a product layer and a release layer; tailoring the protection film according to a shape and a size of the flat screen together with a locating area, and drilling locating holes on the locating area, cutting an intersection line of an edge of the flat screen and the locating area on the protection film by half-cut, wherein the intersection line separates the release layer from the product layer and keeps the productive layer as a whole; wherein a length of the locating area is 10-50 mm;

b) sticking a peeling stick, wherein the step b) particularly comprises steps of:

sticking a peeling stick on a position which is 0.5~0.8 mm away from the intersection line after tailoring the protection film, wherein the position is on a surface of the release layer within a flat screen area, wherein a length of the peeling stick is 6~10 mm longer than a width of the flat screen; and c) pasting the protection film, wherein the step c) particularly comprises steps of:

locating the protection film where the peeling stick is stuck by the locating holes, then putting a device with the flat screen to paste the protection film under the flat screen area of the protection film, pushing the peeling stick by a roller for erecting the protection film, keeping pushing the roller in such a manner that the peeling stick gradually peels off the release layer of the protection film from the product layer, pressing the product layer of the protection film towards the flat screen by the roller for pasting until the product layer of the protection film is fully pasted on the flat screen.

* * * * *